US010827877B2

(12) United States Patent
Cohan

(10) Patent No.: US 10,827,877 B2
(45) Date of Patent: Nov. 10, 2020

(54) GRILL EXTENSION SYSTEM

(71) Applicant: Jacob Cohan, Sun Valley, CA (US)

(72) Inventor: Jacob Cohan, Sun Valley, CA (US)

(*) Notice: Subject to any disclaimer, the term of this patent is extended or adjusted under 35 U.S.C. 154(b) by 375 days.

(21) Appl. No.: 15/703,539

(22) Filed: Sep. 13, 2017

(65) Prior Publication Data

US 2019/0075967 A1 Mar. 14, 2019

(51) Int. Cl.
*A47J 37/07* (2006.01)

(52) U.S. Cl.
CPC ........... *A47J 37/07* (2013.01); *A47J 37/0786* (2013.01); *A47J 2037/0795* (2013.01)

(58) Field of Classification Search
CPC .............. A47J 2037/00795; A47J 37/07; A47J 37/0786; A47J 2037/0795; A47J 37/079; A47J 33/00; A47J 2037/0777; A47J 37/0768
USPC .................. 99/448, 426, 444, 445, 446, 449
See application file for complete search history.

(56) References Cited

U.S. PATENT DOCUMENTS

| | | | |
|---|---|---|---|
| 3,062,127 A | 11/1962 | Lang | |
| 3,692,012 A | 9/1972 | Wiggins | |
| 4,023,474 A | 5/1977 | Dixon | |
| 4,569,279 A | 2/1986 | Avner | |
| 5,133,333 A * | 7/1992 | Stout | A47J 37/0694 108/35 |
| 6,135,014 A * | 10/2000 | Chang | A47J 37/0763 126/25 R |
| 8,418,685 B2 | 4/2013 | Strauch | |
| D716,609 S | 11/2014 | Greer | |
| 2007/0204856 A1* | 9/2007 | Elwell | F24C 15/16 126/337 R |
| 2009/0020491 A1 | 1/2009 | Foster | |
| 2013/0055506 A1* | 3/2013 | Greer | A47J 37/0786 7/109 |
| 2016/0051087 A1* | 2/2016 | Nguyen | A47J 37/067 99/445 |
| 2018/0184840 A1* | 7/2018 | Maga | A47J 33/00 |

OTHER PUBLICATIONS

Kamado Joe, Amazon.*

* cited by examiner

*Primary Examiner* — Phuong T Nguyen

(57) ABSTRACT

A grill extension system for cooking food items at a lowered temperature on a grill includes a first grill that may have a food item positioned thereon for cooking. A second grill is selectively positioned on the first grill such that the second grill is spaced from the first grill. A food item is positioned on the second grill for cooking at a lower temperature compared to the first grill.

2 Claims, 4 Drawing Sheets

GRILL EXTENSION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to grill devices and more particularly pertains to a new grill device for cooking food items at a lowered temperature on a grill.

BRIEF SUMMARY OF THE INVENTION

An embodiment of the disclosure meets the needs presented above by generally comprising a first grill that may have a food item positioned thereon for cooking. A second grill is selectively positioned on the first grill such that the second grill is spaced from the first grill. A food item is positioned on the second grill for cooking at a lower temperature compared to the first grill.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
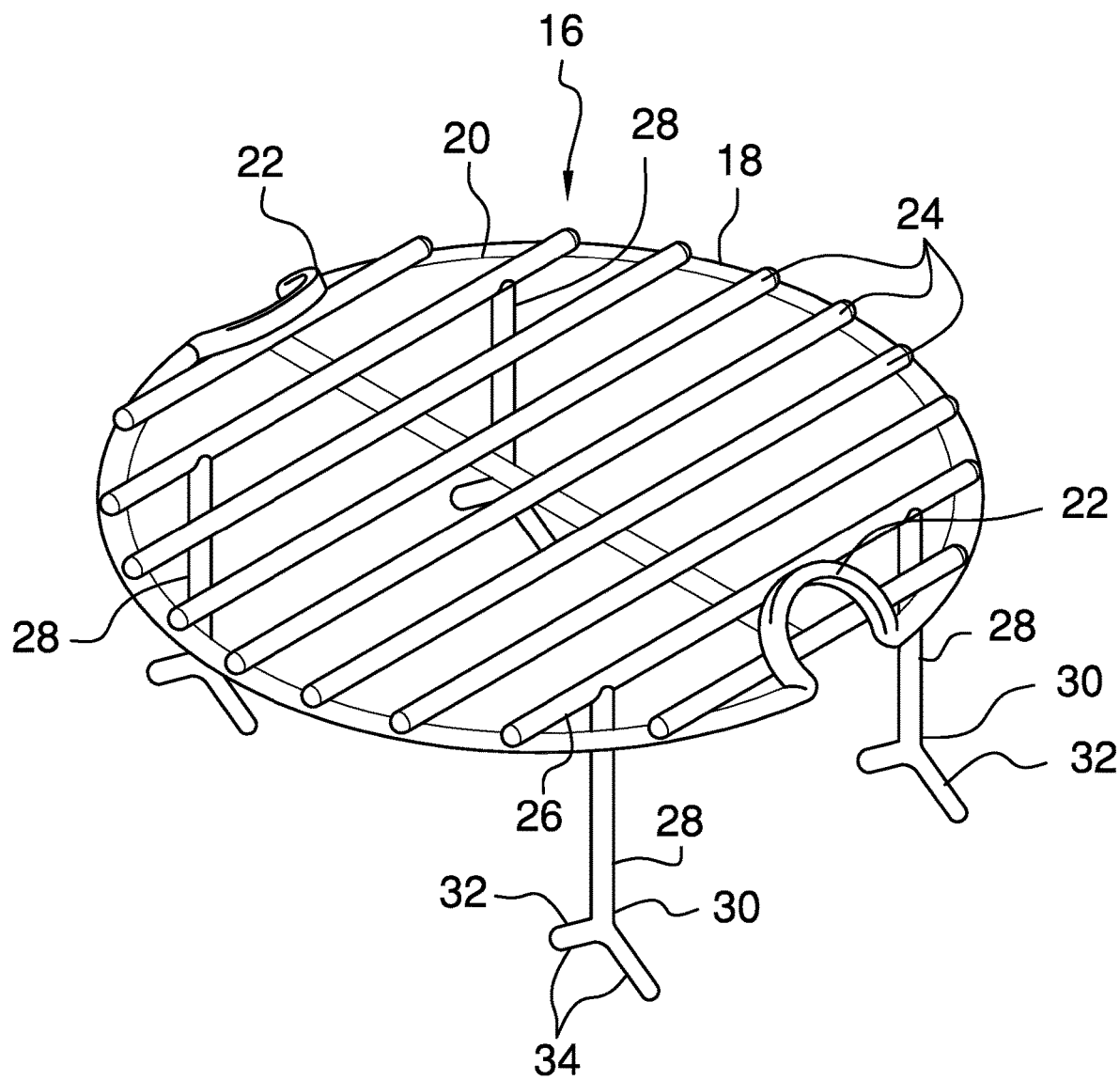
FIG. 1 is a top perspective view of a second grill of a grill extension system according to an embodiment of the disclosure.
Figure 2:
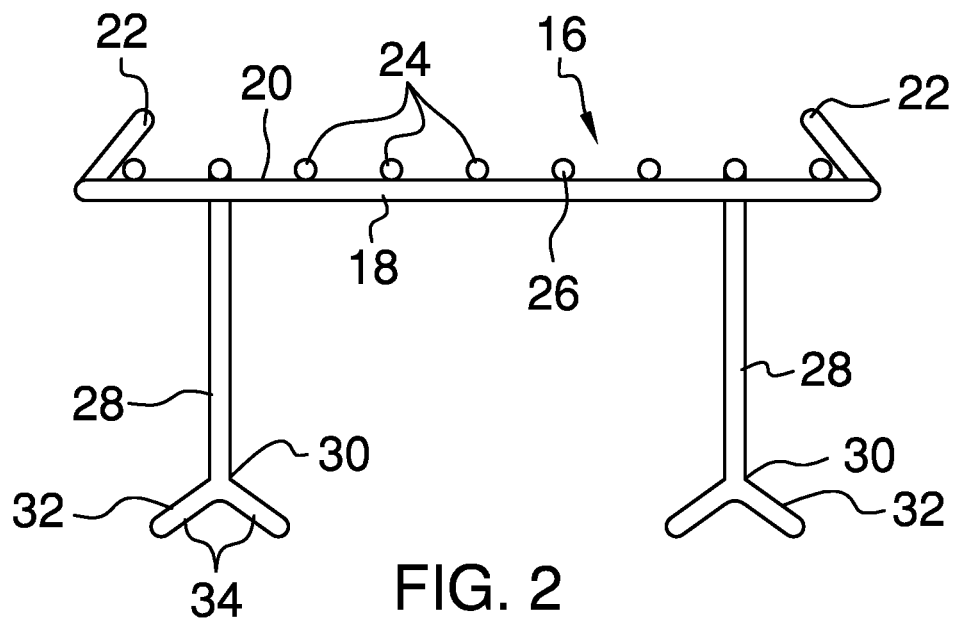
FIG. 2 is a front view of an embodiment of the disclosure.
Figure 3:
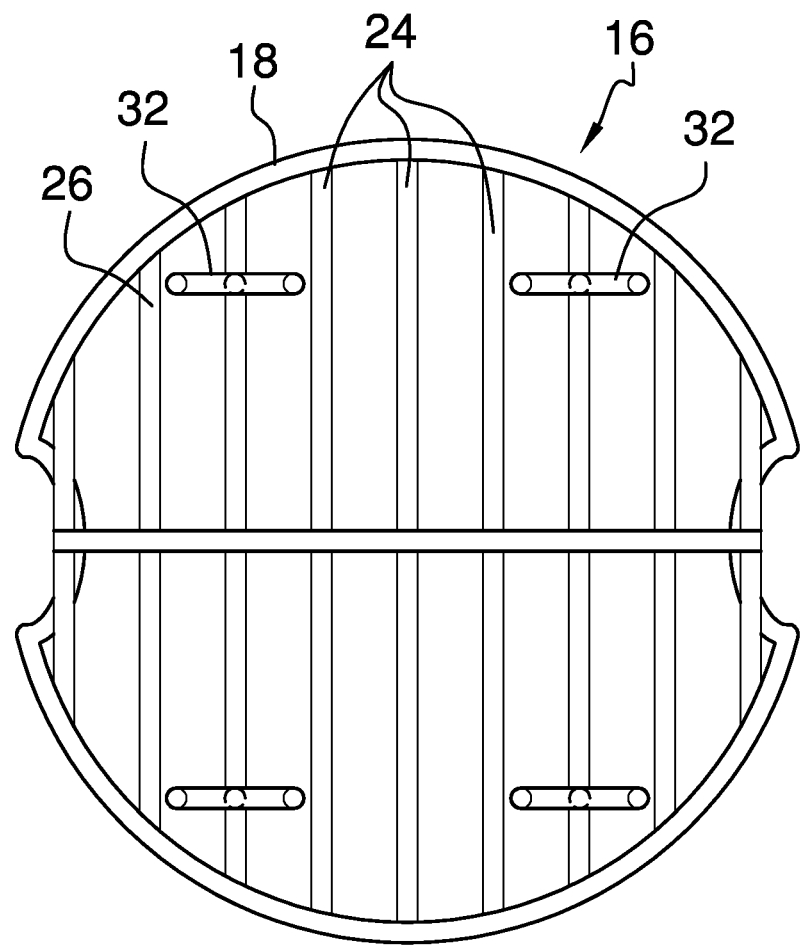
FIG. 3 is a bottom view of an embodiment of the disclosure.
Figure 4:
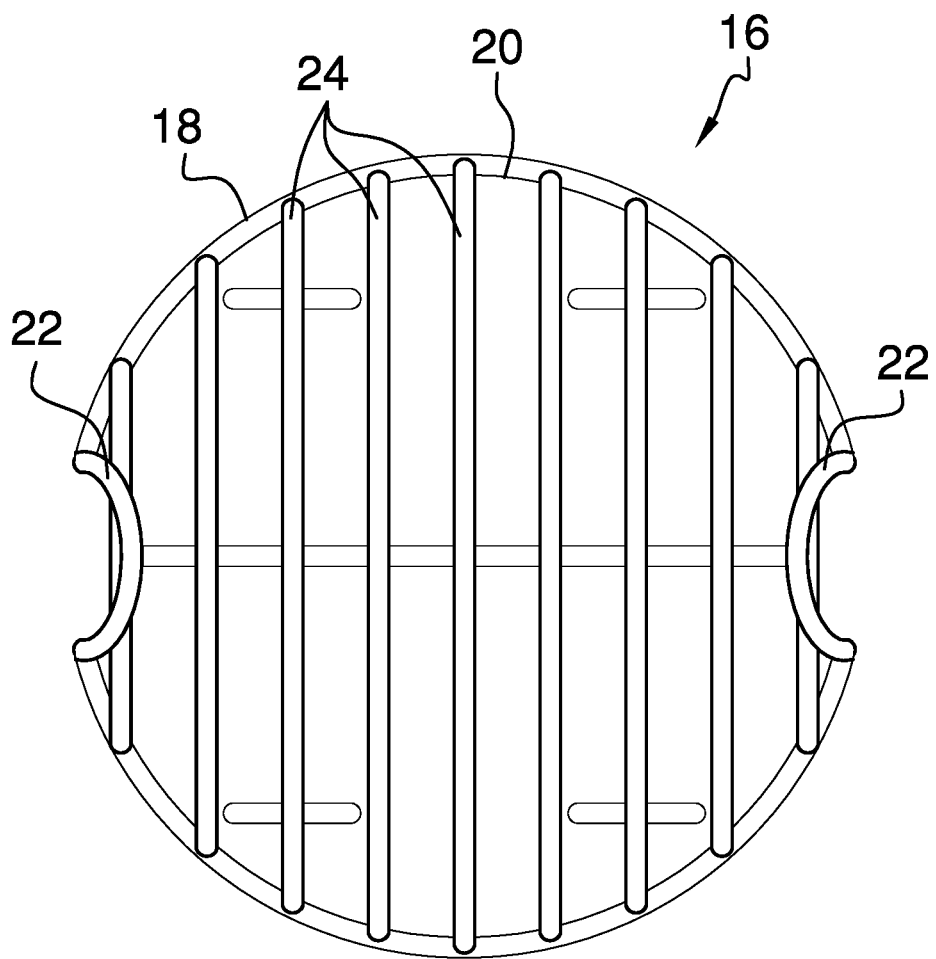
FIG. 4 is a top view of an embodiment of the disclosure.
Figure 5:
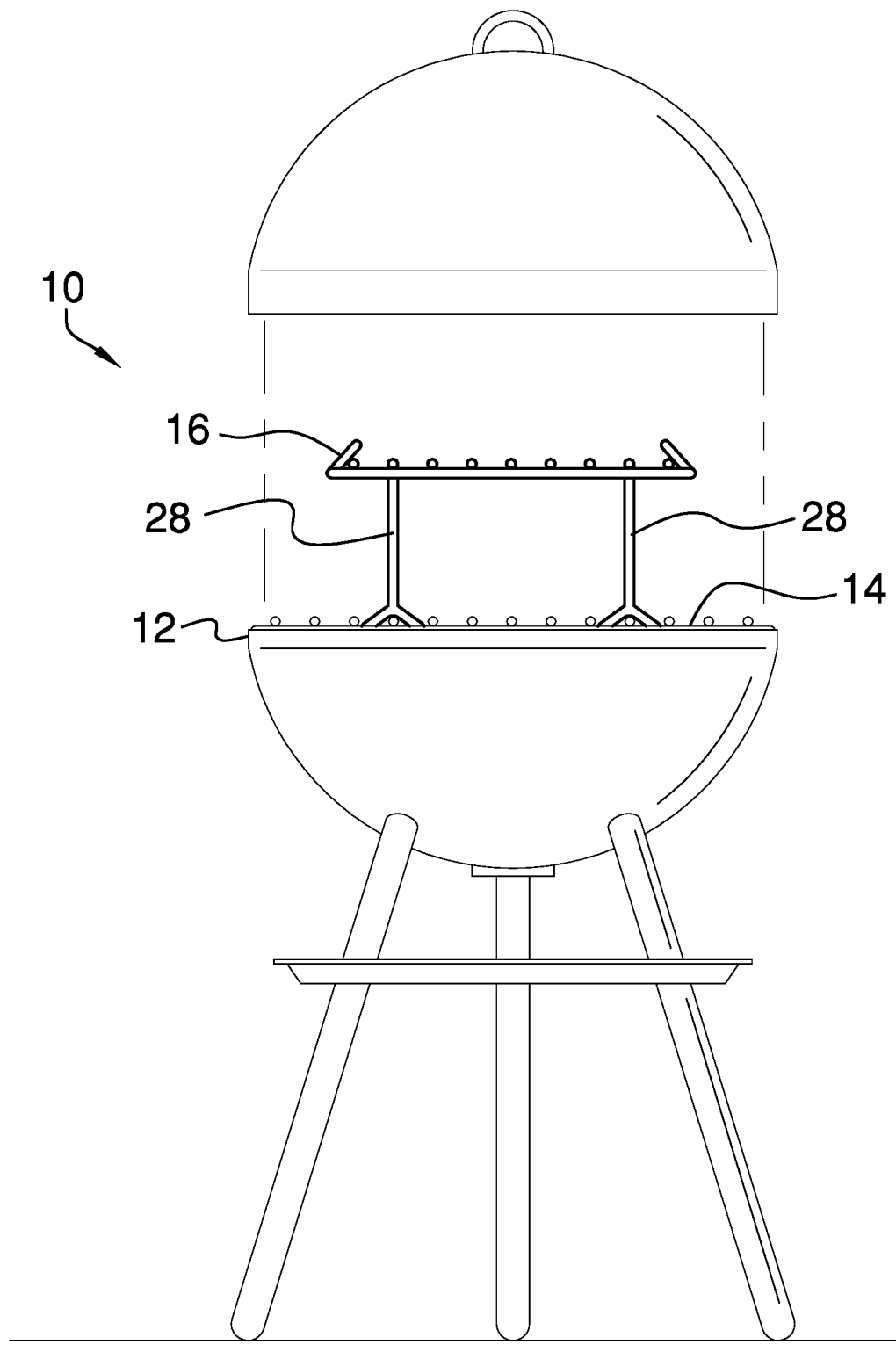
FIG. 5 is a perspective in-use view of an embodiment of the disclosure.

With reference now to the drawings, and in particular to FIGS. 1 through 5 thereof, a new grill device embodying the principles and concepts of an embodiment of the disclosure and generally designated by the reference numeral 10 will be described.

As best illustrated in FIGS. 1 through 5, the grill extension system 10 generally comprises a first grill 12 that may have a food item positioned thereon for cooking. The first grill 12 has a top side 14 and the first grill 12 may be a charcoal grill, a gas grill and any other type of grill for cooking. A second grill 16 is provided and the second grill 16 is selectively positioned on the first grill 12 such that the second grill 16 is spaced from the first grill 12. In this way the second grill 16 is exposed to a lower temperature than the first grill 12. A food item is selectively positioned on the second grill 16 for cooking. In this way the food item on the second grill 16 is cooked at a lower temperature compared to the first grill 12.

The second grill 16 comprises a first member 18. The first member 18 is continuous such that the first member 18 forms a closed loop and the first member 18 has a top side 20. A pair of handles 22 is provided and each of the handles 22 is coupled to and extends upwardly from the top side 14 of the first member 18 for gripping. Each of the handles 22 angles inwardly toward a center of a circle defined by the first member 18. Moreover, each of the handles 22 may be a unitary structure of the first member 18.

A plurality of second members 24 is provided and each of the second members 24 is coupled to the top side 14 of the first member 18. The food item is selectively positioned on the second members 24 for cooking. Each of the second members 24 extends across an entire diameter of the first member 18. The second members 24 are spaced apart from each other and each of the second members 24 has a bottom side 26.

A plurality of third members 28 is provided and each of the third members 28 is coupled to and extends downwardly from the bottom side 26 of an associated one of the second members 24. Each of the third members 28 has a distal end 30 with respect to the second members 24. Moreover, the third members 28 are spaced apart from each other and are distributed on the second grill 16. Each of the third members 28 forms an associated one of four corners of a rectangle.

A plurality of feet 32 is provided and each of the feet 32 is coupled to the distal end 30 of an associated one of the third members 28. Each of the feet 32 engages the first grill 12 such that the each of the second members 24 is spaced from the first grill 12. Each of the feet 32 may comprise a pair of rods 34 that each angle laterally away from the associated third member. Moreover the rods 34 corresponding to each of the feet 32 may form a V shape. In this way each of the feet 32 may engage members on the first grill 12 thereby inhibiting the second grill 16 from sliding on the first grill 12.

In use, the second grill 16 is selectively positioned on the first grill 12 when a lower cooking temperature compared to the first grill 12 is desired. Thus, vegetables and other food items that would otherwise burn on the first grill 12 may be cooked on the second grill 16. The second grill 16 is removed from the first grill 12 when cooking is finished. Additionally, the second grill 16 is washed at any selected time.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grill extension system comprising:
    a first grill being configured to have a food item positioned thereon for cooking, said first grill having a top side; and a
    second grill being selectively positioned on said first grill such that said second grill is spaced from said first grill, said second grill being configured to have a food item positioned thereon for cooking, said second grill comprising
    a first member, said first member having a top side, said first member having a pair of diametrically opposed breaks,
    a pair of handles, each of said handles being coupled to and extending upwardly from said top side of said first member wherein each of said handles is configured to be gripped, each of said handles being coupled to and extending from opposed ends of a respective one of said breaks wherein said first member and said pair of handles form a closed loop, each of said handles angling inwardly toward a center of a circle from a maximum width of said closed loop, each of said handles being continuously arcuate extending between said opposed ends,
    a plurality of second members, each of said second members being coupled to said top side of said first member wherein each of said second members is configured to have the food item positioned thereon; and
    a plurality of third members, each of said third members being coupled to and extending downwardly from said bottom side of an associated one of said second members, each of said third members having a distal end with respect to said second members,
    wherein said third members are spaced apart from each other and distributed on said second grill such that each of said third members forms an associated one of four corners of a rectangle.

2. A grill extension system comprising:
    a first grill being configured to have a food item positioned thereon for cooking, said first grill having a top side; and
    a second grill being selectively positioned on said first grill such that said second grill is spaced from said first grill, said second grill being configured to have a food item positioned thereon for cooking, said second grill comprising:
    a first member, said first member having a top side, said first member having a pair of diametrically opposed breaks,
    a pair of handles, each of said handles being coupled to and extending upwardly from said top side of said first member wherein each of said handles is configured to be gripped, each of said handles being coupled to and extending from opposed ends of a respective one of said breaks wherein said first member and said pair of handles form a closed loop, each of said handles angling inwardly toward a center of a circle from a maximum width of said closed loop, each of said handles being continuously arcuate extending between said opposed ends,
    a plurality of second members, each of said second members being coupled to said top side of said first member wherein each of said second members is configured to have the food item positioned thereon, each of said second members extending across said first member, said second members being parallel to each other and spaced apart from each other, each of said second members having a bottom side,
    a plurality of third members, each of said third members being coupled to and extending downwardly from said bottom side of an associated one of said second members, each of said third members having a distal end with respect to said second members, said third members being spaced apart from each other and distributed on said second grill such that each of said third members forms an associated one of four corners of a rectangle, and
    a plurality of feet, each of said feet being coupled to said distal end of an associated one of said third members, each of said feet and engaging said first grill such that said each of said second members is spaced from said first grill.

* * * * *